April 16, 1957
J. L. HAM ET AL
2,789,152
ELECTRIC FURNACE FOR PRODUCTION OF METALS
Filed June 1, 1955
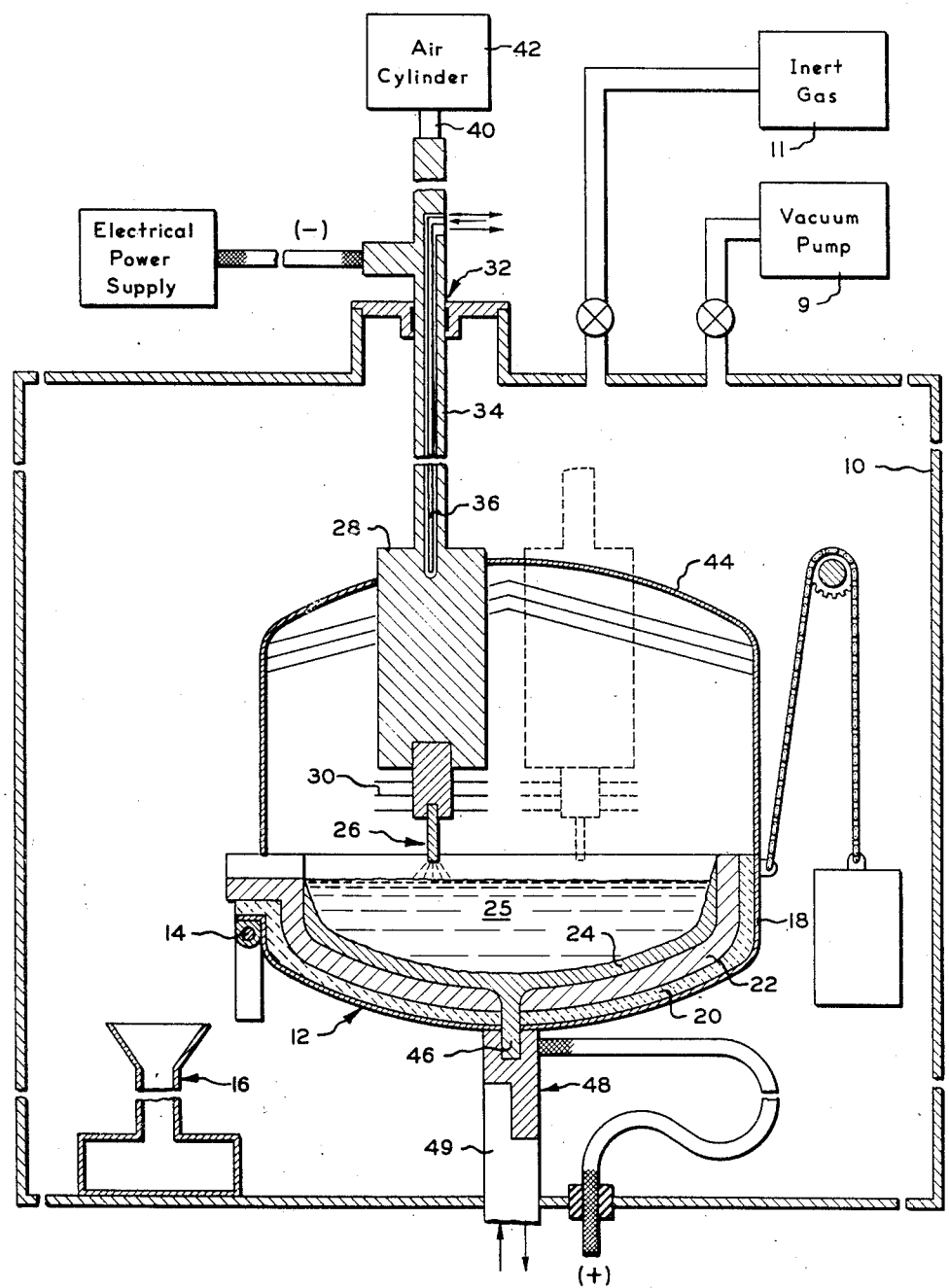
INVENTORS
John L. Ham
David I. Sinizer
BY
Oliver W. Horges
ATTORNEY United States Patent Office 2,789,152
Patented Apr. 16, 1957

2,789,152

ELECTRIC FURNACE FOR PRODUCTION OF METALS

John L. Ham, Wellesley Hills, and David I. Sinizer, Bedford, Mass., assignors to National Research Corporation, Cambridge, Mass., a corporation of Massachusetts Application June 1, 1955, Serial No. 512,470

3 Claims. (Cl. 13—31)

The present invention relates to the production of metals and more particularly to the production of castings of titanium and other highly reactive metals.

In the production of large castings of titanium and similar metals, it is essential that a large quantity of titanium be maintained molten. Due to the high reactivity of titanium, the "skull" melting thereof has recently become quite popular. This permits the maintenance of a large pool of molten titanium within a "skull" of solid titanium which serves as a container during the melting operation. In order to accomplish skull melting, it is essential that one or more arcs be maintained to the surface of the titanium confined by the skull. Arc melting has the advantage that the thickness of the skull can be accurately controlled and a highly localized source of heat obtained. However, arc melting has the inherent disadvantage that the electrode must be cooled to a certain extent to disperse some of the heat of the arc so as to prevent the melting of the electrode as well. In the past, water-cooled electrodes have been employed for arc melting titanium and other refractory metals. While such electrodes are eminently satisfactory when operating in the manner for which they were designed, they have the decided disadvantage that a leak in the electrode can permit water or other coolant to contact the molten titanium with disastrous results. Recent explosions in titanium melting facilities have been of sufficient severity to require complete reappraisal of the potential hazards involved in the use of water-cooled electrodes.

Accordingly, it is a principal object of the present invention to provide an arc melting furnace which is particularly adapted to the skull melting of titanium and which includes a maximum amount of protection to the operators with a minimum amount of complicated protective mechanism.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a diagrammatic, schematic, partially sectional view of one preferred embodiment of the invention.

In the present invention, the electrode for use as the source of the titanium-melting arc is supported by a massive electrode support which is preferably formed of a metal of high heat conductivity such as copper. The support is preferably a unitary element which has no seams or joints and which extends to the outside of the furnace chamber from the inside thereof. It also has a water passage extending down a major portion of the length of the electrode support substantially along the axis thereof. Any such electrode support has certain requirements which are in some respects contradictory and in other respects complementary. From the standpoint of space and economy of material, it is desired that the electrode support have a minimum diameter. From the standpoint of safety, it is highly desirable that the distance along the electrode support between the termination of the water passage and the electrode be as large as possible without exceeding a safe temperature limit at the hot end. In any event, the end of the water passage must be sufficiently far removed from the electrode itself so that even gross negligence on the part of the furnace operator will not permit burning through of the wall of the water passage in the event of inadvertent arcing to the electrode support. Equally, it is highly desirable that the flow of cooling water down the electrode support be at a relatively low rate so as to provide a minimum flow of water through the inside of the furnace chamber at any time.

The furnace of the present invention also preferably includes a radiation shield above the crucible to prevent an undue loss of heat by radiation from the molten metal in the crucible. In order to provide cooling for the titanium "skull," the bottom of the skull is preferably provided with a stud portion which extends through the bottom of the crucible into engagement with a massive heat conductor which, in turn, can engage a cooled high-conductivity cooling block extending through the bottom of the furnace housing.

Referring now to the drawing, there is illustrated one preferred embodiment of the invention which will be discussed in connection with the melting of titanium to produce a large pool of molten titanium which can be poured into a suitable mold therefor. A vacuum-tight furnace chamber 10 is provided, this chamber being arranged to be evacuated by means such as a usual vacuum pumping system 9. The furnace is also preferably arranged to be subjected to a reduced pressure, or even an atmospheric pressure, of an inert gas such as argon from a suitable supply 11. Inside of the furnace there is provided a crucible 12 arranged to be pivoted about a trunnion 14 so as to permit the pouring of molten titanium into a mold schematically indicated at 16. The crucible is preferably a "skull" type of crucible comprising (a) an outer steel jacket 18, (b) a layer of refractory insulation 20, (c) a graphite crucible 22 and (d) a solid titanium "skull" 24. The skull 24 supports therewithin a molten pool of titanium 25. A plurality of electrodes 26 is included for maintaining suitable arcs to the molten titanium pool. Each electrode 26 is carried by an electrode support 28. The electrode supports are preferably formed of a material of high heat conductivity such as copper and include a massive lower section to which the electrode 26 is fastened. A plurality of heat shields is also preferably included adjacent the bottom of each electrode support 28 to minimize transfer of radiant heat from the arc to the end of the electrode support. The electrode support is preferably forged from a single billet of metal so as to form a solid mass of sufficient length to extend to the outside of the vacuum chamber through an appropriate vacuum seal 32. Each electrode support is preferably provided with a small passage 34 extending substantially along its axis to permit flow of cooling water down inside of the electrode support. The end of the water passage is preferably positioned so that it is always a substantial distance (e. g., a few inches) above the melt surface when the electrode support is in its lowest possible position. Thus the electrode support, in the event of complete failure of the electrode, can serve as the arc-supporting structure. In this event, the electrode support can be burned away to a sufficiently large extent so that the arc will gradually be lengthened. The arc length will soon reach a point where it is so great that it can no longer be supported by the available voltage. Accordingly, the arc will be extinguished before it can rupture the end of the water passage.

In a preferred embodiment of the invention, a pipe 36 is positioned in the cooling water passage 34, this pipe permitting flow of water downwardly to the bottom of the passage 34, the water returning upwardly on the outside of the pipe 36. As mentioned previously, it is highly desirable that as long a distance as possible be maintained between the end of the water passage 34 and the electrode 26. This distance is preferably on the order of 7 inches or more so as to provide an adequate mass of copper between the electrode and the end of the water passage in the event of accidental arcing to the electrode support. The maximum distance is limited only by the conductivity and cross-sectional area of the electrode support. If it is too great with respect to these limiting factors, the temperature drop along the electrode support will be too great and the temperature thereof at the electrode may equal or exceed the safe operating temperature of the electrode support. This maximum distance will depend upon the conductivity of the material forming the electrode support, the cross-sectional area thereof, and the amount of heat entering the electrode support from the electrode. Naturally, the higher the conductivity and the larger the cross-sectional area, the longer this distance can be.

Since it is possible that some failure of water supply or other unforeseen event might create a stoppage in water flow or temporary increase in pressure, it is preferred that the portion of the water passage 34 adjacent the bottom thereof have walls which are at least one inch thick so as to prevent any unexpected rupturing thereof. Accordingly, water passage 34 preferably has a diameter on the order of an inch or two, while the radius of the lower portion of the electrode support 28 is at least an inch greater than the radius of the water passage 34. Each electrode support 28 is preferably carried by a rod 40 connected to a means, such as pneumatic cylinder 42, which permits raising and lowering of the electrode support. This permits the electrode 26 to clear a heat shield 44 which is preferably provided over the crucible 12, and also permits tilting of the crucible when it is desired to pour the charge of molten metal.

Since it is essential that a solid titanium "skull" be maintained adjacent the graphite crucible liner to prevent contamination of the charge of molten titanium, it is highly desirable to provide a means for removing heat from the bottom of the crucible. In a preferred embodiment of the invention, the titanium "skull" is provided with a downwardly extending stud 46 which passes through the bottom of the crucible 12. This stud 46 is connected to a massive conductor 48 which serves as a ground return for the plurality of electrodes. In one preferred embodiment, the massive conductor 48 is arranged to contact a matching massive cooling block 49 which can be cooled to extract heat from the titanium stud 46. This cooling block 49 is preferably formed of a massive block of copper which extends through the bottom of the furnace tank and is provided at its outer end with a passage for a cooling fluid such as water or the like. Block 49 is preferably stationary and is arranged to be engaged by block 48 when the crucible is in the melting position (as shown).

In the operation of the furnace described above, a charge of titanium to be melted is placed in the crucible and the furnace chamber is then sealed and evacuated by pump 9. After evacuation, electrodes 26 are moved down into position and a reduced pressure of argon is introduced into the furnace chamber to simplify maintenance of an arc. The charge is melted down and then alloying additions can be made by any suitable mechanism (not shown). The electrode supports 28 are then moved to the upper position so as to be free of the crucible during its tilt. The crucible is then tilted so as to pour the charge of molten titanium or alloy into a previously positioned mold 16. If desired, an additional charge of titanium may then be added to the emptied crucible and the filled mold can be replaced with an empty mold by means such as those shown in U. S. Patent 2,625,719. This has the advantage that it is not necessary to cool the crucible before an additional charge of titanium is added thereto. If the furnace were opened while the crucible was still at an elevated temperature, a disastrous oxidation of the residual titanium would take place.

As can be appreciated from the above description of the invention, it is extremely difficult for any mishap in the operation of the furnace to create a situation where water or other cooling liquid can contact the molten titanium. For example, even if one of the electrodes should be drastically attacked, such as by becoming splattered with molten titanium, so that a low-melting-point alloy is formed, the result will merely be a spoiled batch of titanium. Even if the electrode were completely destroyed so that the arc extended from the massive block of copper constituting the electrode support, perforation of the water passage would not occur. In the first place, the furnace is preferably so arranged that the electrode support can not be lowered more than a predetermined amount so that, even if the bottom of the electrode support serves as the electrode, the arc length will gradually increase as the electrode support is melted away, thereby finally extinguishing the arc. However, such drastic destruction of the electrode support could hardly be expected to take place, since any arc to the electrode support 28 will give the characteristically brilliant green color encountered in arcing to copper. This should make the presence of the mishap known to even the most casual furnace operator. Additionally, a temperature-sensing device in the cooling water supply for the individual electrode supports can indicate (by a suitable alarm) the approach of the arc to the water passage.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. A furnace for skull melting titanium and like refractory metals, the furnace comprising a vacuum-tight housing, means for evacuating the housing, a crucible for holding a mass of metal to be melted, a radiation shield over the crucible, an electrode for arc melting the mass of metal, an elongated unitary massive electrode support extending through a vacuum-tight seal carried by said housing, said electrode support also extending through said radiation shield, a water passage extending down said electrode support substantially at the axis thereof, said electrode being secured to the lower end of said support, the end of the water passage in the electrode support being at least five inches from the electrode, the wall of the electrode support defining the water passage adjacent its lower end being at least one inch in thickness.

2. A furnace for skull melting titanium and like refractory metals, the furnace comprising a vacuum-tight housing, means for evacuating the housing, a crucible for holding a mass of metal to be melted, an electrode for arc melting the mass of metal, an elongated unitary massive copper electrode support extending through a vacuum-tight seal carried by said housing, a water passage extending down the axis of said electrode support, said electrode being secured to the lower end of said support, the end of the water passage in the electrode support being at least five inches from the electrode, the amount of copper between the water and the electrode being sufficient to maintain a temperature drop of less than about 500° C. along the electrode support, the wall of the copper electrode support defining the water passage adjacent its lower end being at least one inch in thickness.

3. The furnace of claim 2 wherein the electrode support includes means for maintaining the end of the water passage at least several inches above the melt level in the crucible.

References Cited in the file of this patent

UNITED STATES PATENTS

| | | |
|---|---|---|
| 1,003,483 | Weintraub | June 3, 1913 |
| 1,980,555 | Elder | Nov. 13, 1934 |
| 2,541,764 | Herres et al. | Feb. 13, 1951 |
| 2,600,823 | Zaccagnini | June 17, 1952 |
| 2,625,719 | Moore | Jan. 20, 1953 |
| 2,727,936 | Boyer | Dec. 20, 1955 |